Patented June 5, 1945

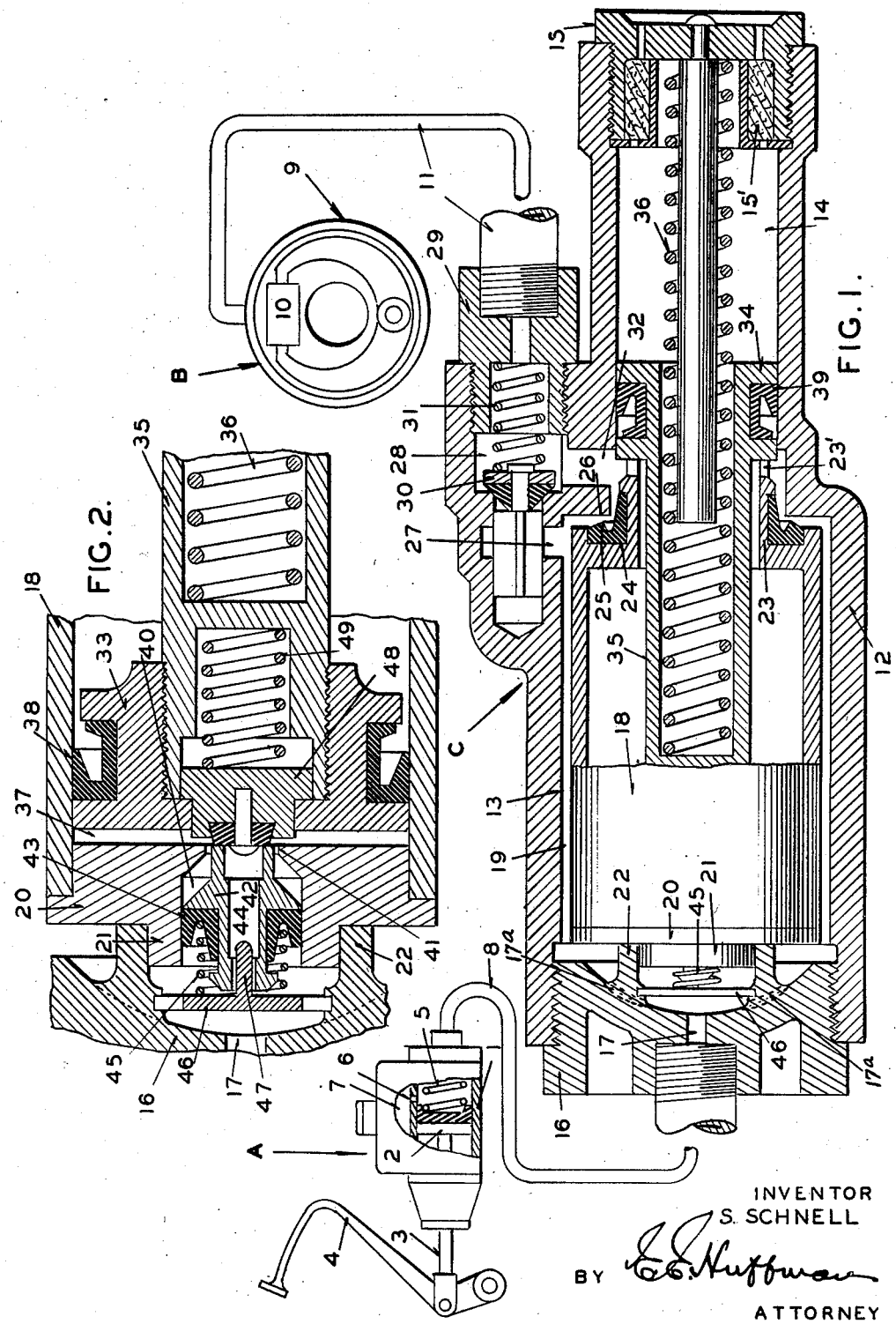

2,377,813

UNITED STATES PATENT OFFICE 2,377,813

FLUID PRESSURE COMPOUNDING SYSTEM

Steve Schnell, Kirkwood, Mo., assignor to Wagner Electric Corporation, St. Louis, Mo., a corporation of Delaware Application July 2, 1943, Serial No. 493,233

12 Claims. (Cl. 60—54.5)

My invention relates to fluid pressure systems and more particularly to a system wherein the fluid pressure from the source can be compounded or boosted.

One of the objects of my invention is to produce an improved compounding unit for interpositioning between a source of fluid pressure and a device to be actuated, which unit is so constructed that it will function automatically when the fluid pressure from the source is above a predetermined value.

Another object of my invention is to produce an improved compounding unit which will not be caused to function prematurely when a sudden high fluid pressure is developed at the source but does not immediately become effective in the device to be actuated.

Other objects of my invention will become apparent from the following description taken in connection with the accompanying drawing in which Figure 1 is a schematic showing of a fluid pressure system having a compounding device embodying my invention, said compounding device being shown as an enlarged partial sectional view; and Figure 2 is a sectional view showing valve structure details.

Referring to the figures in detail, the fluid pressure system comprises essentially three units, namely, a pressure producing unit in the form of a master cylinder device A, an actuated unit B, and an improved compounding unit C. The master cylinder device comprises a cylinder 1 having reciprocable therein a piston 2 connected by a piston rod 3 to a brake pedal 4. The piston is normally biased to its inoperative position by a spring 5 and when it is in this position, it uncovers a porthole 6 to place the cylinder ahead of the piston in communication with a reservoir 7. The outlet of the master cylinder device is connected to the compounding unit C by a conduit 8. The actuated unit B is shown as a brake but may be any other device which it is desired to actuate. The braking assembly 9 is operated by a fluid motor 10 which is connected to the compounding unit by a conduit 11.

My improved compounding unit comprises a casing 12 having inter-communicating cylinders 13 and 14 of different diameters open at their outer ends. The open end of the smaller cylinder 14 is closed by a perforated plug 15 carrying a filter 15' and the open end of the larger cylinder 13 is closed by a plug 16 having an inlet port 17 to which conduit 8 is connected in order that cylinder 13 can receive fluid under pressure developed by the master cylinder device.

Positioned within the larger cylinder 13 is a cylindrical shell 18 of an external diameter less than the diameter of cylinder 13 in order to provide a space 19 between the cylinders through which fluid may flow. Pressure fluid is conducted from port 17 to space 19 through a plurality of ducts 17a, only two of which are shown. The shell 18 is closed at the end adjacent port 17 by a plug 20 which is provided with a cylindrical extension 21 for telescopic reception in guides 22 on the inner side of plug 16. The other or forward end of shell 18 is provided with a reduced extending portion 23 having slots 23' in its end and mounted on this portion is a yieldable valve element 24. This valve element has an annular sealing rib 25 for cooperation with the surface 26 at the junction ends of cylinders 13 and 14.

The inner end of cylinder 13 is provided with an outlet port 27 communicating with a passage 28 in the wall of the casing. A fitting 29 connects passage 28 to conduit 11 which, as previously mentioned, communicates with the fluid motor of the brake assembly. Passage 28 is provided with a check valve 30 biased to closed position by a spring 31. The check valve permits fluid to flow from cylinder 13 through port 27 to conduit 11 but prevents any return flow of fluid back through port 27. A passage 32 is provided in the casing for placing the inner end of shell 18 in communication with passage 28 and conduit 11 when valve element 24 is seated.

Within shell 18 is a piston 33 and within cylinder 14 is a piston 34, said pistons being connected by a hollow piston rod 35 integral with piston 34. A retracting spring 36 is interposed between the closure plug 15 of cylinder 14 and the connected pistons 33 and 34 in order to bias them toward their inoperative positions, which positions are determined by the abutting of the end of shell 18 against closure plug 16. Under these conditions piston 34 abuts the end of extension 23 on shell 18. With the pistons and shell 18 in their inoperative positions, a chamber 37 will exist between piston 33 and the end plug 20 of the shell. Pistons 33 and 34 have associated therewith packing cups 38 and 39, respectively, which are so associated with the pistons as to prevent fluid from passing the pistons from the space between the pistons.

The plug 20 closing the end of shell 18 is provided with a bore 40 having a reduced inner end provided with a port 41 placing the bore in communication with chamber 37 between plug 20 and piston 33. In bore 40 is a piston 42 having a sealing cup 43 on the side toward the inlet port 17.

Piston 42 is provided with a through-passage 44 and a spring 45 biases the piston toward the reduced end of the bore, said spring being positioned between cup 43 and a plate 46 carried by plug 16 which closes the end of casing 12. Plate 46 is provided with a projection 47 extending into passage 44 to thus restrict flow of fluid through the passage from inlet port 17.

Piston 33 carries a valve element 48 which has limited movement in piston 33 and this element is acted upon by a spring 49 of predetermined strength to hold it in one of its forward positions. The valve element 48 cooperates with the inner end of passage 44 in piston 42 to thus normally close this passage. Since spring 49 is substantially stronger than light spring 45 acting on piston 42, the valve element will engage and move piston 42 away from the end of bore 40 when piston 33 is in its retracted position as determined by spring 36.

Referring to the operation of the improved fluid pressure compounding system just described, the parts of the compounding unit will be in the positions shown when the master cylinder device is not being operated. Under these conditions spring 36 will move pistons 33 and 34 so that piston 34 will engage the end of the shell and move it so plug 20 in the other end thereof will engage the guides of plug 16 of the casing. Passage 44 will be closed by valve element 48. Valve element 24 carried by the shell will be unseated from surface 26.

If fluid under pressure is developed by the master cylinder device, it will enter port 17 of the compounding unit and act on plug 20 of shell 18, thus forcing this shell to the right against the action of spring 36 and causing valve element 24 at the forward end of the shell to become seated on surface 26. The movement of the shell also carries with it pistons 33 and 34 and there will be no change in their relative positions. Fluid pressure is free to flow past check valve 30 and into fluid motor 10 of the brakes, which fluid will have the same pressure as that developed by the master cylinder device. The same fluid pressure will also be present in the inner part of shell 18 ahead of piston 33 and act on this piston and piston 34. Since the net effective area of piston 33 is considerably smaller than the area of plug 20 and both areas are acted upon by the same fluid pressure, the shell will be maintained in the forward position in order to hold valve element 24 seated by differential pressure. The retracting spring 36 is only strong enough to return the pistons to their inoperative positions and displace piston 42 to the position shown. The fluid pressure developed by the master cylinder device will also be effective in passage 44 of piston 42 and act on the exposed end of valve element 48. The same fluid pressure will act on piston 42 and such pressure will move piston 42 and the closed valve element 48 to the right until piston 42 abuts the reduced end of bore 40. Movement of piston 42 to the right will cause pressure to be developed in chamber 37 between piston 33 and plug 20 and this fluid pressure will be effective on both sides of valve element 48 since it has a loose sliding fit in piston 33.

When the fluid pressure developed by the master cylinder device reaches a predetermined value, valve element 48 will be unseated against the bias of spring 49 of predetermined strength. The predetermined value at which valve element 48 becomes unseated depends upon the strength of spring 49 and the area of valve element 48 exposed to fluid pressure in passage 44. For the purpose of this description, the predetermined value can be assumed as being one hundred pounds per square inch. When valve element 48 becomes unseated, fluid under pressure will enter chamber 37 and increase the pressure therein. This increased pressure will then act on piston 33 and move this piston to the right relatively to shell 18. Since piston 33 is connected to piston 34, the two pistons will be moved in unison and due to the fact that the forward area of piston 33 is larger than the rear area of piston 34, fluid pressure will be developed by piston 33 and forced out of passage 32 and into conduit 11 behind check valve 30. This fluid pressure will be greater than that developed by the master cylinder device due to the fact that the area of piston 33 acted upon by the fluid pressure from the master cylinder device is greater than the area of piston 33 minus the area of piston 34. Thus there will be a ratio established between the fluid pressure developed by the master cylinder device and the fluid pressure of the fluid motor, which ratio will be determined by the areas of the various pistons. When pistons 33 and 34 are moved to the right as a result of the opening of valve element 48, a compounding action will be present which will boost the master cylinder developed pressure and thus the manual force being applied to the pedal of the master cylinder device will be less to apply the brakes than would be if no compounding action were present, that is, the compounding unit eliminated.

When the fluid pressure developed by the master cylinder device is released, the parts of the compounding unit return to the positions shown in the figures. If the drop in master cylinder developed pressure is rapid, shell 18 will be moved to the left with piston 33, thus unseating valve element 24 and permitting fluid to flow back to the master cylinder device. Spring 36, together with the fluid pressure, will return pistons 33 and 34 to their inoperative positions wherein valve element 48 will again be seated to close the open end of passage 44 through piston 42. The fluid pressure in chamber 37 will be forced out through passage 44 and also around the periphery of cup 43 during the return of the parts to their normally inoperative positions.

The compounding unit just described will not become operative when there is a sudden and rapid actuation of the master cylinder device causing high fluid pressures to be developed instantaneously. These high fluid pressures will not cause unseating of valve element 48 even though they are above the one hundred pounds per square inch at which valve element 48 opens since the restriction of passage 44 by projection 47 does not permit this fluid pressure to become effective immediately on valve element 48 to open it. The high fluid pressures will be transmitted to the fluid motor by way of the check valve before the compounding unit begins to function. Thus the possibility of the compounding unit beginning to function before the fluid pressure in the fluid motor reaches substantially one hundred pounds per square inch is eliminated under conditions where there is rapid development of fluid pressure by the master cylinder. By preventing the operation of the fluid motor solely by functioning the compounding unit, pedal travel will be saved and also the necessity of a large volume of fluid displacement by the master cylinder device. Even if valve element 48 should be forced off its seat by a momentary high pressure above one hundred pounds per square inch, the opening of the valve will permit the fluid under pressure present in passage 44 to drop by diffusing into the larger chamber 37. When this occurs, the valve element will again close until the fluid under pressure in passage 44 is one hundred pounds per square inch. Thus piston 33 would not be moved until such time has elapsed as to permit one hundred pounds per square inch pressure to become effective in the fluid motor 10 of the brake assembly.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system, a source of fluid pressure, a fluid motor, means for permitting fluid pressure from the source to be effective in the fluid motor, and means for causing the fluid pressure from the source to establish a greater fluid pressure in the motor when the fluid pressure from the source is above a predetermined value, said last named means comprising a shell provided with a cylinder and movable by fluid pressure from the source and a valve to prevent flow of fluid from the motor to the source, a differential piston means in the cylinder of the shell for applying pressure to the fluid in the motor, fluid pressure from said source acting against the larger end of said piston and the smaller end of the piston acting on said motor thereby increasing the pressure in said motor, and means for permitting movement of the piston by fluid pressure from the source when the pressure therefrom is above the predetermined value.

2. In a fluid pressure system, a source of fluid pressure, a fluid motor, means for permitting fluid pressure from the source to be effective in the fluid motor, and means for causing the fluid pressure from the source to establish a greater fluid pressure in the motor when the fluid pressure from the source is above a predetermined value, said last named means comprising a shell subject to movement by fluid pressure from the source, valve means controlled by movement of the shell to prevent flow of fluid from the motor to the source, a differential piston in the shell for acting on the fluid effective in the motor, valve means for permitting the fluid pressure from the source to flow into the shell at the rear of the piston and act thereon when the fluid pressure from the source is above the predetermined value and means associated with the valve means for causing a fluid pressure to be developed in the shell at the rear of the piston prior to the valve means being opened.

3. In a fluid pressure system, a source of fluid pressure, a fluid motor, a casing, a shell provided with a cylinder and mounted in the casing for limited reciprocable movement, means for placing the source in communication with the motor and for so subjecting the shell to fluid pressure from the source as to cause it to be moved in one direction, piston means in the cylinder of the shell and arranged to have a smaller area on its forward face than on its rear face, means for placing the cylinder of the shell ahead of the piston in communication with the motor, means for preventing fluid under pressure developed by movement of the piston from communicating with the source and comprising valve means closed by movement of the shell, and means for admitting fluid pressure from the source into the shell at the rear of the piston therein to thereby move the piston but only when the fluid pressure from the source is above a predetermined value.

4. In a fluid pressure system, a source of fluid pressure, a fluid motor, a casing, means for placing the casing in communication with the source, conduit means for connecting the casing to the motor, a shell mounted for limited reciprocation in the casing and provided with a cylinder, said shell being arranged to be acted on and moved by fluid pressure from the source, piston means in the cylinder of the shell and arranged to have a smaller area on its forward face than on its rear face, means for placing the cylinder of the shell ahead of the piston in communication with the motor, means for preventing fluid under pressure developed by movement of the piston from communicating with the source and comprising valve means closed by movement of the shell, and valve means comprising a biased valve element for admitting fluid pressure from the source into the shell at the rear of the piston therein to thereby move the piston but only when the fluid pressure from the source is above a predetermined value.

5. In a fluid pressure system, a source of fluid pressure, a fluid motor, a casing, means for placing the casing in communication with the source, conduit means for connecting the casing to the motor, a shell mounted for limited reciprocation in the casing and provided with a cylinder, said shell being arranged to be acted on and moved by fluid pressure from the source, piston means in the cylinder of the shell and arranged to have a smaller area on its forward face than on its rear face, means for placing the cylinder of the shell ahead of the piston in communication with the motor, means for preventing fluid under pressure developed by movement of the piston from communicating with the source and comprising valve means closed by movement of the shell, and valve means for admitting fluid pressure from the source into the shell at the rear of the piston therein to thereby move the piston but only when the fluid pressure from the source is above a predetermined value, said valve means comprising a valve seat carried by the shell, a valve element mounted on the piston for movement relatively thereto and a spring for biasing the valve element to closed position.

6. In a fluid pressure system, a source of fluid pressure, a fluid motor to be operated, a casing having stepped cylinders, a cylindrical shell mounted on the larger cylinder for limited reciprocable movement, means for conducting fluid from the source to the motor through the casing exterior to the shell, said shell being so arranged as to be acted on and moved by fluid pressure from the source, a piston in the shell and provided with an extension reciprocable in the smaller cylinder of the casing, means for connecting the interior of the shell forward of the piston with the motors, means for connecting the interior of the shell at the rear of the piston with the source when fluid under pressure therefrom reaches a predetermined value, and means comprising valve means closed by movement of the shell for preventing fluid under pressure developed by movement of the piston from communicating with the source.

7. In a fluid pressure system, a source of fluid pressure, a fluid motor, a casing provided with stepped cylinders, conduit means for connecting the larger cylinder with the source, other conduit means for connecting the larger cylinder to the motor, a cylindrical shell mounted for limited reciprocation in the larger cylinder and arranged to be acted on by fluid pressure from the source to cause movement thereof, a piston in the shell, a piston in the smaller cylinder of the casing, a rod connecting the pistons, means for placing the space between the pistons in communication with the motor, means for preventing fluid under pressure developed by movement of the connected pistons from communicating with the source and comprising valve means closed by movement of the shell when acted on by fluid pressure from the source, spring means for biasing the pistons to an inoperative position and for holding the shell in a position where the valve means is open, and valve means for admitting fluid under pressure from the source into the shell at the rear of the piston therein to thereby move the piston when the fluid pressure from the source is above a predetermined value.

8. In a fluid pressure system, a source of fluid pressure, a fluid motor, means for permitting fluid pressure from the source to be effective in the fluid motor, and means for causing the fluid pressure from the source to establish a greater fluid pressure in the motor when the fluid pressure from the source is above a predetermined value, said last named means comprising a shell provided with a cylinder and movable by fluid pressure from the source and valve means to prevent flow of fluid from the motor to the source, a differential piston means in the cylinder of the shell for applying pressure to the fluid in the motor, fluid pressure from said source acting against the larger end of said piston and the smaller end of the piston acting on said motor thereby increasing the pressure in said motor, and means for permitting movement of the piston by fluid pressure from the source when the pressure therefrom is above the predetermined value, said last named means comprising a valve seat carried by the shell engageable with a valve engaging element on said first mentioned means, a movable valve element carried by the piston and spring means for biasing the valve element seated.

9. In a fluid pressure system, a source of fluid pressure, a fluid motor, means for permitting fluid pressure from the source to be effective in the fluid motor, and means for causing the fluid pressure from the source to establish a greater fluid pressure in the motor when the fluid pressure from the source is above a predetermined value, said last named means comprising a shell provided with a cylinder and movable by fluid pressure from the source and means to prevent flow of fluid from the motor to the source, piston means in the cylinder of the shell for applying pressure to the fluid in the motor and means for permitting movement of the piston by fluid pressure from the source when the pressure therefrom is above the predetermined value, said last named means comprising a differential piston carried by the shell and provided with a passage, fluid pressure from said source acting against the larger end of said piston and the smaller end of the piston acting on said motor thereby increasing the pressure in said motor, a movable valve element carried by the piston for closing the passage, a light spring acting on the last named piston and biasing it toward the valve element, a spring of predetermined strength greater than the light spring acting on the valve element for biasing it toward closed position and opposing the light spring and spring means acting on the first piston means for biasing said piston means to a position in the shell where the valve element closes the passage.

10. In a compounding unit for interpositioning between a conduit conducting fluid under pressure from a source and a conduit conducting fluid under pressure to a fluid motor, said unit comprising a casing having an inlet and an outlet, a cylindrical shell mounted for limited reciprocation in the casing and arranged to be acted on and moved by fluid pressure entering the casing through the inlet, valve means controlled by movement of the shell when acted on by fluid pressure for cutting off communication between the interior of the shell and the inlet, means for placing the interior of the shell in communication with the outlet, a by-pass around the valve means, a check valve for the by-pass, a differential piston in said shell, fluid pressure from said source acting against the larger end of said piston and the smaller end of the piston acting on said motor thereby increasing the pressure in said motor, and means for placing the interior of the shell at the rear and large end of the piston in communication with the inlet when fluid pressure from the source entering the inlet is a predetermined value, the small and front end of the piston connected with the conduit conducting fluid under pressure to said motor.

11. In a compounding unit for interpositioning between a conduit conducting fluid under pressure from a source and a conduit conducting fluid under pressure to a fluid motor, said unit comprising a casing having stepped cylinders and provided with an inlet at the outer end of the larger cylinder and an outlet adjacent the inner end of the larger cylinder, a cylindrical shell of smaller external diameter than the larger cylinder of the casing and being mounted in said larger cylinder for limited reciprocation and arranged to be acted on and moved by fluid pressure entering the casing through the inlet and passing around the shell to the outlet, a piston in the shell, a piston in the smaller cylinder of the casing, a rod connecting said pistons, valve means controlled by movement of the shell and acted on by fluid pressure for cutting off communication between the interior of the shell ahead of the piston therein and the inlet, means for placing the interior of the shell ahead of the piston therein in communication with the outlet at all times, a by-pass around the valve means, a check valve for the by-pass, and means for placing the interior of the shell at the rear of the piston therein in communication with the inlet port when fluid pressure from the source entering the inlet is a predetermined value.

12. In a compounding unit for interpositioning between a conduit conducting fluid under pressure from a source and a conduit conducting fluid under pressure to a fluid motor, said unit comprising a casing having stepped cylinders and provided with an inlet at the outer end of the larger cylinder and an outlet adjacent the inner end of the larger cylinder, a cylindrical shell of smaller external diameter than the larger cylinder of the casing and being mounted in said larger cylinder for limited reciprocation and arranged to be acted on and moved by fluid pressure entering the casing through the inlet and passing around the shell to the outlet, a piston in the shell, a piston in the smaller cylinder of the casing, a rod connecting said pistons, valve means controlled by movement of the shell and acted on by fluid pressure for cutting off communication between the interior of the shell ahead of the piston therein and the inlet, means for placing the interior of the shell ahead of the piston therein in communication with the outlet at all times, a by-pass around the valve means, a check valve for the by-pass, valve means for placing the interior of the shell at the rear of the piston therein in communication with the inlet port when fluid pressure from the source entering the inlet is a predetermined value, and spring means for biasing the piston in the shell to one end thereof and the shell to a position where the valve means controlled thereby is open.

STEVE SCHNELL.